United States Patent [19]
Alexander

[11] 3,901,570
[45] Aug. 26, 1975

[54] RESIN SHAFT AND BEARING FOR SANDBOX TOY

[75] Inventor: James C. Alexander, Orchard Park, N.Y.

[73] Assignee: The Quaker Oats Company, Chicago, Ill.

[22] Filed: Aug. 5, 1974

[21] Appl. No.: 494,624

[52] U.S. Cl. .............................................. 308/238
[51] Int. Cl. ............................................ F16c 33/04
[58] Field of Search ....... 308/237 R, 237 A, DIG. 8, 308/238; 272/31 R, 1 A, DIG. 3

[56] References Cited
UNITED STATES PATENTS

| | | | |
|---|---|---|---|
| 2,891,792 | 6/1959 | Thoeming | 308/238 X |
| 2,998,397 | 8/1961 | Riesing | 308/238 X |
| 3,053,593 | 9/1962 | Blair et al. | 308/238 |
| 3,131,977 | 5/1964 | Wirtz | 308/238 |
| 3,400,988 | 9/1968 | Hudson et al. | 308/238 X |

*Primary Examiner*—Robert S. Ward, Jr.
*Assistant Examiner*—Gene A. Church
*Attorney, Agent, or Firm*—Cumpston, Shaw

[57] ABSTRACT

A resin shaft and a resin bearing are formed so the bearing is a sleeve surrounding the shaft and the bearing and shaft are rotatable relative to each other. Either the shaft or the bearing has a plurality of axial ridges extending generally radially to define a plurality of grooves between the ridges extending continuously for axial length of the bearing. The grooves open outward at at least one end of the bearing, and the distal edges of the ridges terminate at the locus of a generally cylindrical shape having a predetermined clearance from a generally smooth cylindrical surface on the other element. Both the radial extent of the ridges and the distance between adjacent ridges are several times the expected size of sandbox sand particles.

10 Claims, 4 Drawing Figures

PATENTED AUG 26 1975    3,901,570
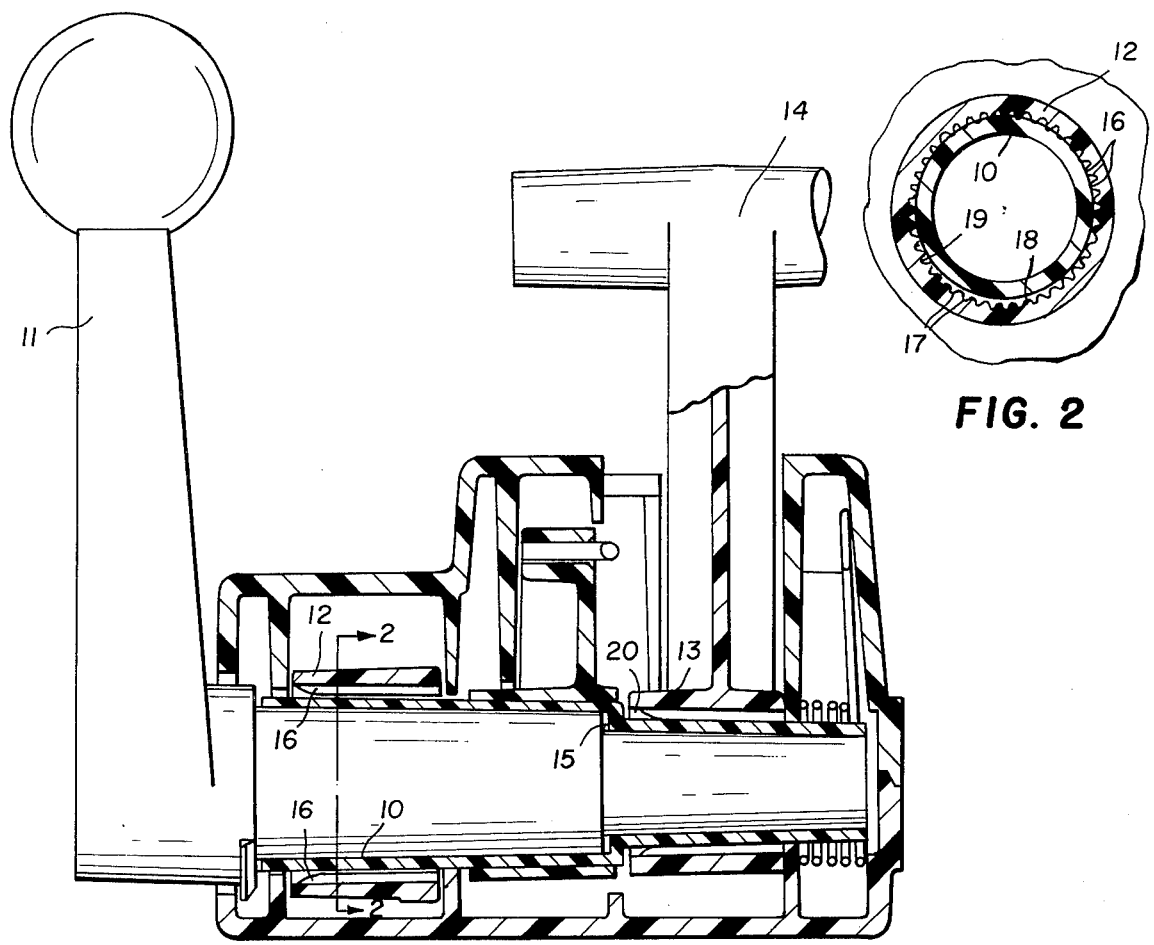
FIG. 2
FIG. 1
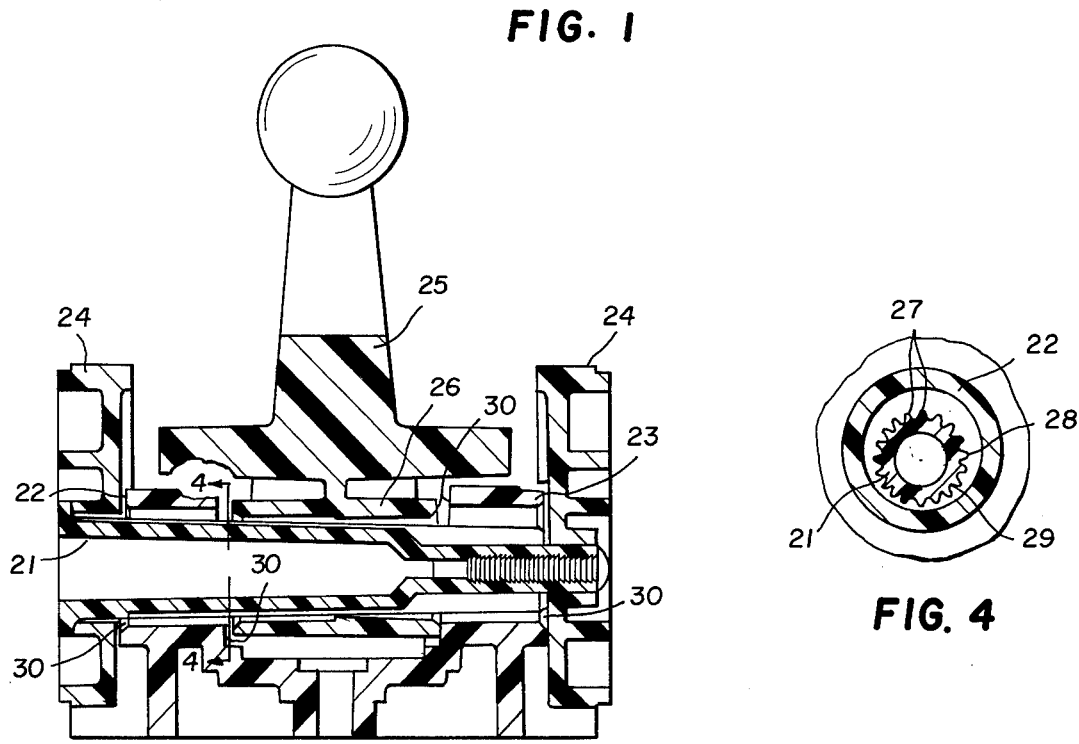
FIG. 3
FIG. 4

RESIN SHAFT AND BEARING FOR SANDBOX TOY

THE INVENTIVE IMPROVEMENT

Relatively rugged and long-lived sandbox toys have previously been made of metal with relatively small diameter shafts rotating in relatively small metallic bearings. Sand could get into the bearings and cause some wear, but the bearing wasn't large enough for the sand to jam the shaft and prevent its rotation, and the metal had a relatively long wear life even in sandy conditions. Plastics have also been substituted for metal parts in sandbox toys, but rotatable shafts were generally made of metal and kept to a relatively small diameter for rotating in plastic bearings. Sand in plastic bearings wears the plastic, but does not jam the relatively small diameter shaft, and if enough plastic is used, the wear life is satisfactory.

The invention proposes a resin shaft and a resin bearing for a sandbox toy with the shaft having a substantially larger diameter than prior art metal shafts for sandbox toys. This produces a much larger bearing surface and causes more substantial problems when sand gets in the bearing. The invention involves analysis of the bearing problems for sandbox toys and proposes a way that bearings and shafts can both be made of resin material with large bearing surfaces without being jammed by sand in the bearings and being generally self-clearing of sand. The invention aims at resin shafts and bearings that are rugged, long lived, easily workable in all the expected sandy conditions, safe, and generally efficient for high-quality sandbox toys.

SUMMARY OF THE INVENTION

The inventive shaft and bearing are each formed of resin material and structured for a high-quality sandbox toy. A resin bearing element is formed as a sleeve generally concentrically surrounding a resin shaft element so the bearing element and the shaft element are rotatable relative to each other. A plurality of axial ridges are formed on one of the elements and extend generally radially toward the other one of the elements to define a plurality of grooves between the ridges extending continuously for substantially the axial length of the bearing element. The grooves open outward at at least one axial end of the bearing element, and the distal edges of the ridges terminate at the locus of a generally cylindrical shape having a predetermined diameter. The other one of the elements has a generally smooth and generally cylindrical surface having a diameter differing by a predetermined amount from the diameter of the cylindrical shape locus to afford a predetermined clearance between the distal edges of the ridges and the smooth cylindrical surface. Both the distance between adjacent distal edges of the ridges and the radial distance from the distal edges of the ridges to the proximal ends of the ridges is several times the expected size of sandbox sand particles so that sand in the bearing works its way along the grooves and out of the bearing without jamming the action of the shaft and bearing.

DRAWINGS

FIG. 1 is a longitudinal axial cross-sectional view of a preferred embodiment of the inventive shaft and bearing;

FIG. 2 is a fragmentary, cross-sectional view of the shaft and bearing of FIG. 1, taken along the line 2—2 thereof;

FIG. 3 is a longitudinal, axial cross-sectional view of another preferred embodiment of the inventive shaft and bearing; and FIG. 4 is a fragmentary, cross-sectional view of the shaft and bearing of FIG. 3, taken along the line 4—4 thereof.

DETAILED DESCRIPTION

In the embodiment of FIGS. 1 and 2, a hollow resin shaft 10 is operated by handle 11 and supports a resin bearing element formed of two similar bearing parts 12 and 13 joined to opposite sides of a boom, (not shown) that can be raised and lowered by operating handle 14. Bearing elements 12 and 13 are similar, except that bearing element 12 has a larger diameter than bearing element 13. Shaft 10 is slightly tapered and has a step 15 reducing the diameter between elements 12 and 13.

Each of the bearing elements 12 and 13 has radially inward extending ridges 16, and each of the ridges 16 has a proximal end 17 and a distal edge 18, and as best shown in FIG. 2, distal edges 18 terminate at the locus of a generally cylindrical shape slightly larger than the outside diameter of shaft 10 in the region of the bearing element to provide a predetermined clearance between the smooth and cylindrical outside surface of shaft 10 and the distal edges 18 of ridges 16. Grooves 19 between ridges 16 extend continuously without interruption for substantially the full axial length of each of the bearing elements 12 and 13, and grooves 19 open outward at axial end region 20 of each bearing element.

The radial distance from the distal edge 18 to the proximal end 17 of each of the ridges 16 is several times the expected size of sandbox sand particles, and also, the distance between adjacent distal edges 18 of ridges 16 is several times the expected size of sandbox sand particles. Typical sand particles for sandboxes are about 0.015 to 0.020 inches in diameter, and the radial extent of ridges 16 and the width of grooves 19 is preferably several times the sand particle dimension, and in one successful version of the inventive shaft and bearing, ridges 16 were made about 0.1 inches in radial extent and spaced apart by about 0.1 inches so that the ridge height and spacing was about 5 times the largest sand particle size.

In the course of play, sand particles enter the space between shaft 10 and bearing elements 12 and 13, but because of ridges 16, the sand particles tend to collect in grooves 19, and even if the bearings are substantially filled with sand particles, the sand works into grooves 19 and does not collect or wedge up in masses that can jam the relative rotation of bearing elements 12 and 13 on shaft 10. When the bearings are filled with sand, the operating action becomes stiffer, but if the action is worked a bit, the sand loosens and works its way along grooves 19 to fall out the open end regions 20 of bearing elements 12 and 13. Many different types of sand and dirt have been worked into bearing elements 12 and 13, and all have been self clearing in response to operating the action of the toy. Also, the inventive shaft and bearing has been found to have a long wear life and be very rugged and durable.

FIGS. 3 and 4 show another preferred embodiment of the inventive shaft and bearing with ridges on a shaft element rather than on a bearing element. Shaft 21 is hollow, slightly tapered, and formed of molded resin material and supported in a pair of generally fixed bearing elements 22 and 23. Frame parts 24 are fixed to opposite ends of shaft 21 and rotate with shaft 21. A lever 25 is also mounted on shaft 21 and has a sleeve 26 surrounding shaft 21 for rotation relative to shaft 21. The insides of bearing elements 22 and 23 and sleeves 26 are generally smooth, cylindrical surfaces, generally concentric with shaft 21.

As best shown in FIG. 4, shaft 21 has a plurality of ridges 27 extending radially outward with their distal edges 28 terminating in a cylindrical shape locus having a smaller diameter than the inside of the bearing elements. Ridges 27 define grooves 29 that extend axially the full length of each of the bearing elements 22 and 23 and the sleeve 26, and the grooves open outward at end regions 30 of the elements surrounding shaft 21. Ridges 27 are also sized and spaced as previously described for ridges 16 so that sand in bearing elements 22 and 23 or inside of sleeve 26 works along grooves 29 and falls out of end regions 30 to keep the bearings operable and make them self clearing of sand. The embodiment of FIGS. 3 and 4 has also demonstrated self-clearing operation and ruggedness and durability for sandbox toys.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the different resin materials, different sizes and shapes of shafts and bearings, and different ridge and groove arrangements for applying the inventive shaft and bearing concepts to various sandbox toys.

I claim:

1. A resin shaft and bearing for a sandbox toy comprising:
   a. a resin shaft element;
   b. a resin bearing element formed as a sleeve generally concentrically surrounding said shaft element so said bearing element and said shaft element are rotatable relative to each other;
   c. a plurality of axial ridges formed on one of said elements and extending generally radially toward the other one of said elements to define a plurality of grooves between said ridges extending continuously for substantially the axial length of said bearing element;
   e. the distal edges of said plurality of ridges terminating at the locus of a generally cylindrical shape having a predetermined diameter;
   f. said other one of said elements having a generally smooth and generally cylindrical surface having a diameter differing by a predetermined amount from said diameter of said cylindrical shape locus to afford a predetermined clearance between said disdtal edges of said ridges and said smooth cylindrical surface;
   g. the distance between adjacent ones of said distal edges of said ridges being several times the expected size of sandbox sand particles; and
   h. the radial distance from said distal edges of said ridges to the proximal end of said ridges being several times the expected size of sandbox sand particles.

2. The resin shaft and bearing of claim 1 wherein said shaft element is hollow.

3. The resin shaft and bearing of claim 1 wherein said shaft element and said bearing element have a corresponding axial taper.

4. The resin shaft and bearing of claim 1 including a plurality of said bearing elements around said shaft element.

5. The resin shaft and bearing of claim 1 wherein said ridges are on said shaft element and including a member having a surface substantially congruent with said generally smooth and generally cylindrical surface and mounted on said shaft element for pivoting relative to said shaft element and relative to said bearing element.

6. The resin shaft and bearing of claim 2 wherein said shaft element and said bearing element have a corresponding axial taper.

7. The resin shaft and bearing of claim 2 including a plurality of said bearing elements around said shaft element.

8. The resin shaft and bearing of claim 4 wherein said ridges are on said shaft element and including a member having a surface substantially congruent with said generally smooth and generally cylindrical surface and mounted on said shaft element for pivoting relative to said shaft element and relative to said bearing element.

9. The resin shaft and bearing of claim 8 wherein said shaft element and said bearing element have a corresponding axial taper.

10. The resin shaft and bearing of claim 9 wherein said shaft element is hollow.

* * * * *